United States Patent [19]

Laguë et al.

[11] Patent Number: 4,480,586

[45] Date of Patent: Nov. 6, 1984

[54] CHAMBER FOR VAPOR IMMUNIZATION OF CHICKENS OR THE LIKE FOWLS

[75] Inventors: Gérald Laguë, Terrebonne; Roman Baldur, Baie d'Urfé; Paul Marois, Montréal; Maurice Brossard, St-Lambert; Marc Quevillon, Anjou; Enrico Di Franco, Laval-des-Rapides; Robert Dugré, Laval, all of Canada

[73] Assignee: I.A.F. Production Inc., Laval-des Rapids, Canada

[21] Appl. No.: 417,572

[22] Filed: Sep. 13, 1982

[51] Int. Cl.³ .......................... A01K 1/03; A61D 7/00
[52] U.S. Cl. ..................................... 119/15; 119/160; 128/200.21
[58] Field of Search ....................... 119/15, 1, 160, 21, 119/35, 37; 128/200.21

[56] References Cited

U.S. PATENT DOCUMENTS

| | | | |
|---|---|---|---|
| 2,335,173 | 11/1943 | Corey | 119/21 |
| 2,847,993 | 8/1958 | Woodruff | 128/200.21 |
| 3,076,745 | 2/1963 | Eames | 119/1 |
| 3,923,006 | 12/1975 | Dugan et al. | 119/37 |
| 4,274,364 | 6/1981 | Forseth | 119/35 |
| 4,305,347 | 12/1981 | Hemenway et al. | 119/15 |

Primary Examiner—Hugh R. Chamblee
Attorney, Agent, or Firm—Oblon, Fisher, Spivak, McClelland & Maier

[57] ABSTRACT

The disclosure describes a chamber for use in immunizing chickens or the like fowls by treating them with a vaccine which is sprayed in the chamber. Inside an enclosure where the chickens are loaded, there is created a continuous flow of air into which is sprayed a vaccine. A deflector cone is used to make sure that the vaccine-loaded flow of air circulates uniformly throughout the enclosure. Furthermore, the pressure inside the enclosure is maintained negative, i.e. it is at a lower level than the outside atmosphere, to make sure that viral particles do not leak outside the vaccination chamber. Finally, means are provided for flushing the chamber and a system such as a filter or/and an incinerator or the like is used to prevent the escape of viral particles to the outside atmosphere. Vaccination with this chamber is safe, economical and does not pollute the environment.

9 Claims, 2 Drawing Figures

CHAMBER FOR VAPOR IMMUNIZATION OF CHICKENS OR THE LIKE FOWLS

BACKGROUND OF THE INVENTION

1. Field of the Invention

This invention relates to a vaccination chamber for chickens. More particularly, the invention is directed to a chamber for use in immunizing chickens or the like fowls by treating them with a vaccine which is sprayed in the chamber. In other words, with the device according to the invention, it is possible to vaccinate chickens or the like fowls through their respiratory tracts.

2. Description of the Prior Art

It is well known that a standard procedure for vaccinating chickens, immediately or soon after their birth, is to give them, individually and manually, an injection of a particular vaccine. The vapor immunization of fowls has been taught in U.S. Pat. No. 2,984,240, issued on May 16, 1961 to A. L. Eames. This Patent generally describes an apparatus wherein the vaccine vapors are gradually supplied and distributed throughout a vaccination chamber which is filled with chicken containers. Basically, by means of a fan, the aim is to achieve a continuous circulation of the vaccine vapors in the entire chamber. The invention taught by Eames is in great need of improvement, since it is not at all certain that all the chickens which are present in the vaccination chamber will in effect be vaccinated. Furthermore, the cabinet designed by Eames has no provision for preventing the vaccine vapors from leaking outside the apparatus during the vaccination period; and what is more serious, there is a problem of pollution of the environment once the vaccination is terminated and the chickens have to be removed from the vaccination chamber. Eames does not teach how it is possible to flush the atmosphere inside the chamber without letting the viral vapors contaminate the air surrounding the immunization chamber. There is therefore a need for an apparatus which is thoroughly effective in the vaccination of chickens or the like birds and which, at the same time is not polluting the atmosphere in the immediate vicinity of the vaccination chamber.

Various enclosures have been described in the prior art, mostly intended to be used as poultry egg hatchers. A non exhaustive list of prior Patents which teach various methods of circulation of the atmosphere within the enclosures includes the following:

| | | |
|---|---|---|
| U.S. Pat. No. 1,823,584 | Sept. 15, 1931 | A. W. Bruce |
| U.S. Pat. No. 1,837,065 | Dec. 15, 1931 | E. M. Pierce |
| U.S. Pat. No. 3,389,688 | June 25, 1968 | C. R. Springer |
| U.S. Pat. No. 3,396,703 | Aug. 13, 1968 | H. B. Trussell |
| U.S. Pat. No. 3,927,642 | Dec. 23, 1975 | Gerd Levin |
| U.S. Pat. No. 4,274,364 | June 23, 1981 | D. A. Forseth |

Springer teaches an air deflector with a convex surface, to be used in a hatcher for circulating air. Levin shows a fan and a heating means to be used in the same types of hatchers. Trussell discloses that air is drawn upwardly through two banks of trays of eggs, and then moves laterally and outside air can be introduced through baffles. In the incubation method of Forseth, the fluid is discharged into the path of air moving upwardly, and then the air moves laterally through two banks of trays containing hatching eggs. None of the references show that it is possible to circulate air loaded with particles of foreign matter while making sure that they are equally concentrated at any place inside the enclosure. Furthermore, none of the prior art references indicate that it is possible to prevent leaks toward the outside air.

References which are considered not pertinent are the following:

| | | |
|---|---|---|
| U.S. Pat. No. 2,702,503 | Feb. 22, 1955 | J. F. Wildhaber |
| U.S. Pat. No. 2,734,444 | Feb. 14, 1956 | A. G. Lunn, Jr., et al |
| U.S. Pat. No. 3,630,174 | Dec. 28, 1971 | R. S. Runkle |
| U.S. Pat. No. 4,023,529 | May 17, 1977 | Jerome J. Landy |

SUMMARY OF THE INVENTION

It is an object of the present invention to provide a chamber which enables the vaccination of poultry or the like fowls through their respiratory tracts while complying with the present day norms of pollution of the environment.

It is another object of the present invention to provide a system wherein all the birds under treatment are reasonably certain to have received the proper dose of virus for immunization.

These and other objects of the present invention may be achieved by providing a chamber for use in immunizing chickens or the like fowls, by treating them with a vaccine which is sprayed in the chamber. The chamber comprises:

an enclosure;

stacks of chicken containers for the enclosure;

the chicken containers having means enabling air to circulate therethrough;

deflecting means mounted on said third wall to deflect the flow of air and to cause it to circulate uniformly through the chicken containers;

means for spraying the vaccine in the flow of air, the vaccine thereby being entrained as a fine mist in the flow of air and thereafter being inhaled by the chickens or the like fowls, resulting in vaccination of the chickens or the like fowls through their respiratory tracts;

means to control the pressure inside the enclosure at a predetermined level which is lower than atmospheric pressure (negative pressure), and which is sufficient to prevent viral particles-containing air from leaking to the outside during the process of vaccination;

means for flushing the enclosure with fresh air from the outside atmosphere when vaccination is terminated and previously to opening the enclosure to remove the chickens or the like fowls therefrom; and means associated with the suction means to prevent any discharge of viral particles to the outside atmosphere when "contaminated" air is being removed from the enclosure.

In accordance with a preferred embodiment of the invention, the enclosure includes lateral walls, front wall, rear wall, bottom and ceiling, and the blower-motor combination is mounted between the lateral walls.

In accordance with another preferred embodiment of the invention, the flow of air is directed towards the rear wall and the deflector is mounted on the rear wall.

In accordance with yet another preferred embodiment of the invention, a first stack of chicken containers is piled on one side of the enclosure, and a second stack of chicken containers is piled on the other side of the enclosure, the first and second stacks of chicken containers being spaced from one another to define a central alley, the blower-motor combination being disposed in the central alley.

In accordance with yet another preferred embodiment of the invention, the deflector is essentially conical in shape.

In accordance with yet another preferred embodiment of the invention, the chamber comprises several atomizers, connected to a supply of vaccine outside the enclosure, to direct a spray of vaccine into the flow of air.

In accordance with yet another preferred embodiment of the invention, the atomizers are mounted for countercurrent injection of the vaccine into the flow of air, so as to prevent projection of the vaccine particles against the surface of said third wall.

In accordance with yet another preferred embodiment of the invention, the suction means comprise a ventilator mounted over the enclosure enabling the viral particles-loaded air to be drawn therefrom through the ceiling.

In accordance with yet another preferred embodiment of the invention, the means associated with the suction means are filtration means which are arranged so that the viral particles-loaded air is drawn outside the enclosure through the filtration means and the viral particles are retained by the filtration means.

In accordance with yet another preferred embodiment of the invention, the filtration means comprises an electronic filter with an efficiency of retention of about 97.5% followed by an absolute filter which is characterized by a minimum initial efficiency of 99.99% DOP and is capable of stopping all the viral particles remaining in the flow of air passing through the electronic filter which means that it delivers air which contains no foreign particles, the air containing viral particles being drawn through the electronic filter and the absolute filter by means of the ventilator, the ventilator following the absolute filter.

In accordance with yet another preferred embodiment of the invention, the means associated with the suction means are incinerator means.

In accordance with yet another preferred embodiment of the invention, a duct is included between the absolute filter and the ventilator, the said duct comprising an opening to the outside atmosphere and a control door attached to the said opening. Means are provided to adjust the said opening so as to maintain a negative pressure inside the chamber.

In accordance with yet another embodiment of the invention, the chamber comprises lateral doors on the lateral walls at the base and towards the front of the enclosure and means are provided for remotely opening and closing of the said doors.

In accordance with yet another preferred embodiment of the invention, the chamber comprises a pressure gauge indicating the difference of pressure between the inside and outside atmosphere.

In accordance with yet another preferred embodiment of the invention means are provided for the remote simultaneous closing of the control door in the duct adjoining the ventilator and the opening of the lateral doors in the lateral walls which facilitates the flushing of the chamber with outside air.

BRIEF DESCRIPTION OF DRAWINGS

Further objects and advantages of the present invention will become apparent as the following description proceeds, taken in conjunction with the accompanying drawings in which.

DESCRIPTION OF PREFERRED EMBODIMENTS

Figure 1:
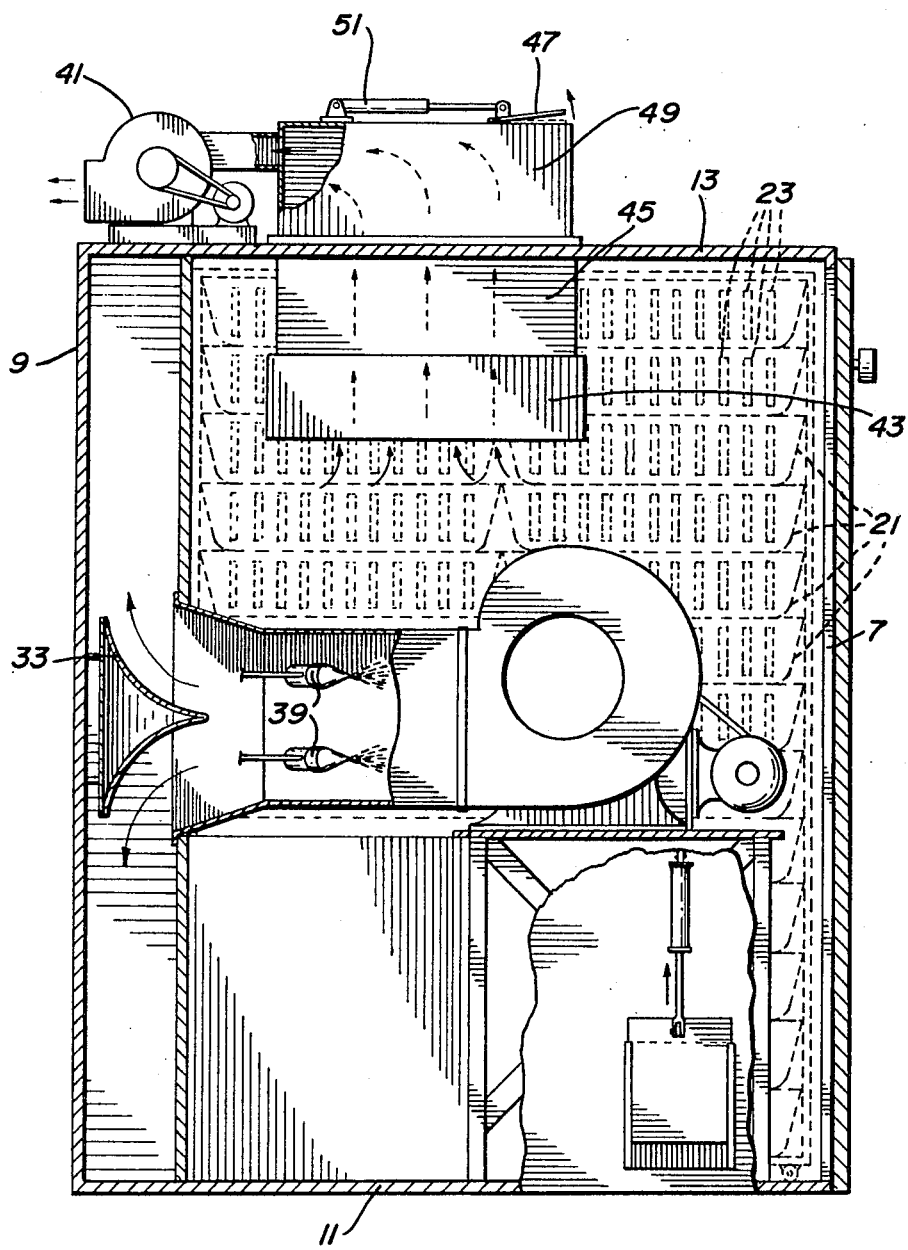
FIG. 1 is a view in elevation of a vaccination chamber according to the invention.
Figure 2:
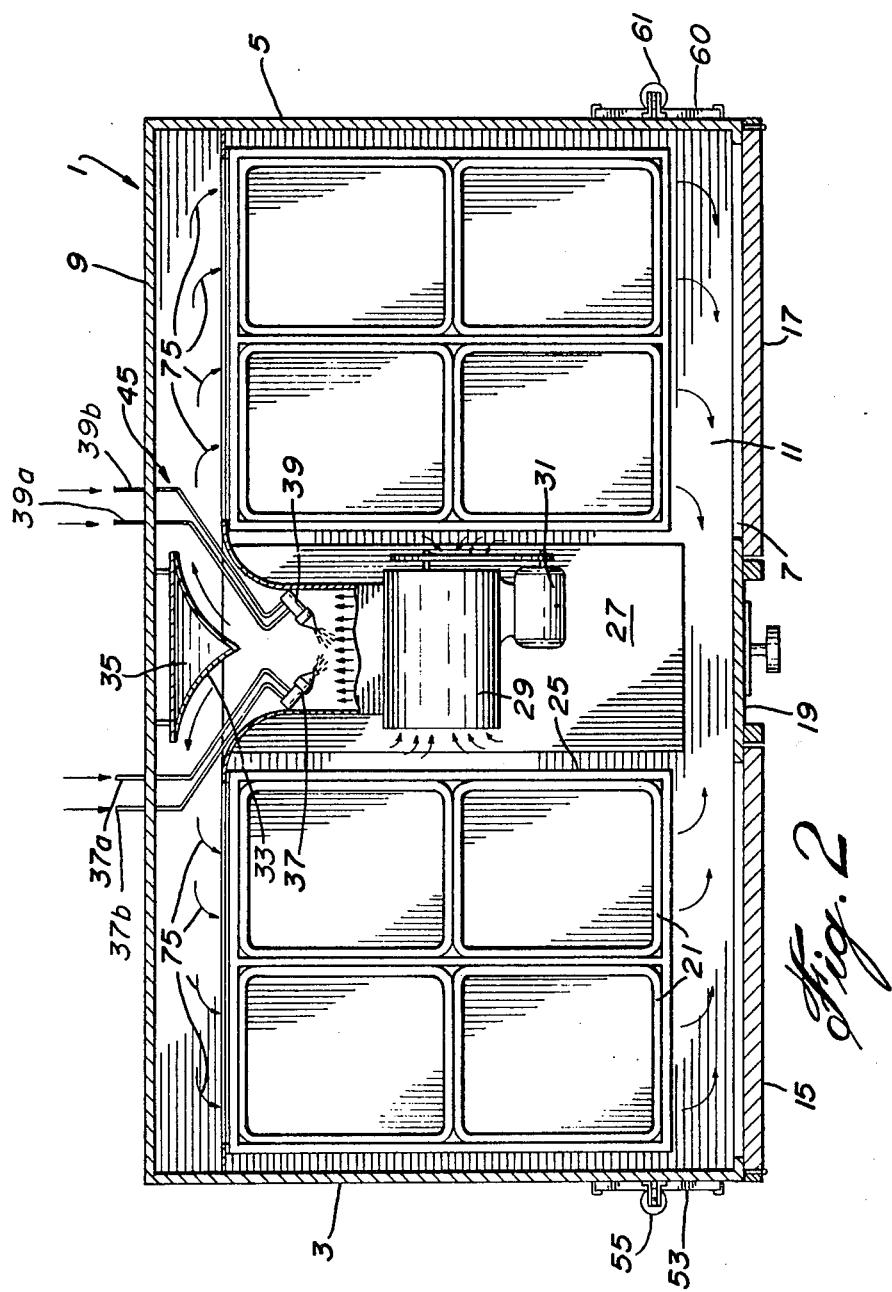
FIG. 2 is a top plan view of the same vaccination chamber.

Referring to the drawings, there is illustrated a vaccination chamber which is in the shape of a box like enclosure 1. As shown, the enclosure 1 includes vertical lateral walls 3 and 5, a front wall 7, a rear wall 9, a bottom 11 and a ceiling 13. The front wall 7 carries two large doors 15 and 17 which are respectively hinged to the left and to the right. For convenience, during the process of loading the enclosure 1, each door 15, 17, should cover nearly half the front wall 7 of the enclosure 1, the only portion of the front of the enclosure not being occupied by the doors 15, 17, being constituted by a central vertical narrow wall strip 19.

This chamber being intended to contain a large number of chickens, the chicken containers consist of trays 21 which are suitably slotted at 23 to enable air to circulate freely therethrough. The trays 21 are piled over one another as shown in FIG. 1 in carriages 25, one carriage 25 occupying the left side of the enclosure 1, while another carriage 25 occupies the right side of the same enclosure 1. The two carriages 25, containing trays 21 loaded with young chickens, are sufficiently spaced from one another as shown in the drawings to define a central alley 27 which will serve to mount some of the equipment necessary for the operation of the vaccination chamber. In practice, each tray is separately loaded with chickens, and the trays are placed in a suitable carriage 25 by mounting them over suitably spaced short brackets (not shown). Then the two carriages 25 are rolled into the enclosure through the doors 15 or 17.

Between the two carriages 25, in the central alley 27, there is a blower 29 which is operated by the motor 31. These two elements are obviously conventional and all that is required is that the blower 29, under the operation of the motor 31, be capable of directing a flow of air towards the rear wall 9, as shown in the drawings. For a good operation of the vaccination chamber, the blower must be centrally located with respect to the lateral walls 3 and 5 and should direct a flow of air perpendicularly to the surface of the rear wall 9, to give a good circulation of air throughout the enclosure and evenly within each tray of chickens.

It was mentioned above that there should be a good circulation of air. This is made possible by mounting a cone on the rear wall directly in the path of the air glow produced by the blower 29. The base 35 of the cone 33 is spaced from the rear wall 9 by a distance as so as to ensure a better circulation of the viral particles-loaded flow of air through the chicken trays 21. At the same time the spacing between the rear wall 9 and the base 35 prevents the viral particles from adhering to the surface of the rear wall before reaching such surface. The particular shape of the deflector cone 33 will make sure that the flow of air loaded with viral particles will reach each tray 21 containing chickens.

This vaccination chamber is designed to vaporize the vaccine within the enclosure 1. This is made possible by spraying the vaccine into the flow of air. For this purpose, there are provided two pairs of atomizers 37 and 39. These atomizers are of standard construction and are each connected to a common supply of vaccine (not shown) which is outside the enclosure. In order to form a good mist, each pair of atomizers 37, 39 is connected to a compressed air duct 37a, 39a and to a duct 37b, 39b connected to a flask containing the vaccine (not shown in the drawings) located outside the enclosure. The spray of viral particles emitted by each atomizer 37, 39 is directed into the flow of air which is produced by the blower 29. In addition, in order to prevent that all or nearly all of the viral particles would be projected against the surface of the rear wall 9, the atomizers 37, 39 are mounted for countercurrent injection of the vaccine into the flow of air. In the embodiment illustrated, the atomizers 37, 39 are oriented into the flow of air at a 45° angle. In this manner the vaccine is entrained as a mist by the flow of air which is thereafter inhaled by the chickens, thus resulting in vaccination of the chickens through their respiratory tracts.

The vaccination chamber would not be fully safe without ensuring a negative pressure in the enclosure 1, when the chickens are being vaccinated. For this purpose, there is provided a ventilator 41 which is mounted above the enclosure 1, on the ceiling thereof. The ventilator 41 will therefore draw viral particles loaded air towards the ceiling, where as it will be seen below, the viral particles will be separated and the air will be sent to the atmosphere. The action of the ventilator 41 will obviously cause a decrease in the pressure of air inside the enclosure 1. A decrease in the air pressure under the enclosure will, in this description and in the appended claims be termed a negative pressure, indicating that the pressure is lower in the enclosure 1 than in the surrounding atmosphere.

Of course the vaccination chamber must be designed to prevent any discharge of viral particles in the outside atmosphere. This is made possible by mounting a filtration system ahead of the ventilator 41, and associating the two units in such a manner that the viral particles loaded-air is drawn outside the enclosure 1 through the filtration system which retains the viral particles.

The filtration system comprises an electronic filter 43 which is well known to those skilled in the art and is effective to retain up to about 97.5% of the particles which are present in the flow of air drawn by the ventilator 41. The electronic filter 43 is followed by an absolute filter which has a minimum initial efficiency of 99.99% DOP and is capable of stopping the viral particles remaining in the flow of air which exits from the electronic filter 43. The absolute filter will hereinafter be referred to by reference numeral 45; it is again well known to those skilled in the art that it will deliver air which contains no foreign particles, such as viral particles. This purity of the air is well accepted and is not considered to be a health hazard. Of course, the drawing of air with viral particles is done by means of the ventilator 41 which is mounted above the enclosure 1 following the absolute filter 45.

Instead of a filtration system, an incinerator (not shown) may be provided to destroy the viral particles.

To make sure that a constant negative pressure is maintained inside the enclosure 1, there is provided a control door 47 in the duct 49 which connects the filter system (including electronic filter 43 and absolute filter 45). A jack 51 has means for adjusting the opening of the control door 47 depending on the desired pressure inside the enclosure 1.

It was pointed out above that the pressure inside the enclosure 1 must be negative, i.e. it must be lower than atmospheric pressure. This negative pressure results from the drawing of air from the enclosure 1 by means of the ventilator 41 and the amount of drawing is controlled by adjusting the opening of the control door 47. A pressure gauge (not shown) is mounted on the exterior side of the box like enclosure to measure the difference of pressure between the inside and outside atmosphere. This pressure gauge is of standard construction and is well known to those skilled in the art. In order to facilitate the flushing of the enclosure 1, lateral doors 53 and 60 are provided at the base and towards the front of the lateral walls 3 and 5. Opening and closing of the lateral doors 53 and 60 is made possible by jacks 55 and 61.

The jacks 55 and 61 and the jack 51 adjacent to the ventilator are activated simultaneously by a single control valve (not shown). The effect of opening the two lateral doors 53 and 60 simultaneously with the closure of the control door 47 permits fresh air to enter the enclosure 1 thereby flushing the inside air loaded with viral particles. The ventilator ensures that all air exits from the enclosure 1 through the filters 43 and 45 and the blower 29 ensures that the inside air is being circulated during the flushing operation.

The various electrical controls and connections which do not form part of the invention have not been shown in order to simplify the illustration of the invention.

Before operating the chamber, the trays are loaded with chickens and the trays are piled in the two carriages where they are firmly set. Then the two carriages are rolled into the enclosure 1 through the two doors 15 and 17. Control door 47 is slightly opened to an extent which is known by experience. Lateral doors 53 and 60 are closed. Then both blowers 29 and 41 are started and the vaccine is introduced into the chambers through the atomizers 37 and 39.

The first ten minutes of operation to atomization of the vaccine in the enclosure takes place. Then, introduction of the vaccine is stopped and there is circulation of the vaccine within the enclosure for another ten minutes.

The enclosure 1 must then be flushed of the remaining viral particles. To do this, the lateral doors 53 and 60 are opened and control door 47 is closed which creates a flow of air from the outside of the enclosure. When the flushing is finished, the carriages are rolled out of the enclosure 1 and the vaccination chamber is ready for another batch.

We claim:

1. A chamber for use in immunizing chickens or the like fowls by treating same with a vaccine which is sprayed in said chamber, comprising:

an enclosure;

stacks of chicken containers for said enclosure;

said chicken containers having means enabling air to circulate therethrough;

a blower-motor combination mounted between two opposite walls of said enclosure, to direct a flow of air towards a third wall of said enclosure;

a first stack of chicken containers piled on one side of said enclosure, and a second stack of chicken containers piled on the other side of said enclosure, said first and second stacks of chicken containers being spaced from one another to define a central alley, said blower-motor combination being disposed in said central alley;

deflecting cone means mounted on said third wall to deflect said flow of air and to cause said air to circulate uniformly through said chicken containers;

means for spraying said vaccine in said flow of air, said vaccine thereby being inhaled by said chickens, resulting in vaccination of said chickens through their respiratory tracts;

suction means to remove air from said enclosure when said chickens are being vaccinated, thereby to maintain a negative pressure of air inside said enclosure;

means associated with said suction means to prevent any discharge of viral particles to the outside atmosphere, when air is being removed from said enclosure;

means to control the pressure inside said enclosure at a predetermined level which is lower than atmospheric pressure, and which is sufficient to prevent viral particles containing air from leaking to the outside;

means for flushing said enclosure when vaccination is terminated and previously to opening said enclosure to remove said chickens therefrom, while preventing viral particles from being thrown into the outside air;

lateral doors provided at the base and towards the front of said enclosure, and remote means of opening and closing of said lateral doors;

a pressure gauge indicating the difference of pressure between the inside and outside atmosphere; and and remote means enabling the control means to close simultaneously as said lateral doors are being opened and vice versa.

2. A chamber for use in immunizing chickens or the like fowls by treating same with a vaccine which is sprayed in said chamber, comprising:

an enclosure;

stacks of chicken containers for said enclosures;

said chicken containers having means enabling air to circulate therethrough;

a blower-motor combination mounted between two opposite walls of said enclosure, to direct a flow of air towards a third wall of said enclosure;

deflecting means mounted on said third wall to deflect said flow of air and to cause said air to circulate uniformly through said chicken container, said deflecting means comprising a cone having a base spaced from said third wall;

means for spraying said vaccine in said flow of air, said vaccine thereby being inhaled by said chickens, resulting in vaccination of said chickens through their respiratory tracts;

suction means to remove air from said enclosure when said chickens are being vaccinated, thereby to maintain a negative pressure of air inside said enclosure;

means associated with said suction means to prevent any discharge of viral particles to the outside atmosphere, when air is being removed from said enclosure;

means to control the pressure inside said enclosure at a predetermined level which is lower than atmospheric pressure, and which is sufficient to prevent viral particles containing air from leaking to the outside; and means for flushing said enclosure when vaccination is terminated and previously to opening said enclosure to remove said chickens therefrom, while preventing viral particles from being thrown into the outside air.

3. A chamber according to claim 2, which comprises two pairs of atomizers connected to a supply of vaccine outside the enclosure, to direct a spray of vaccine into said flow of air.

4. A chamber according to claim 2, wherein said atomizers are mounted for countercurrent injection of said vaccine in said flow of air, so as to prevent projection of vaccine particles against the surface of said at least one wall.

5. A chamber according to claim 2, wherein said means associated with said suction means are filtration means which are arranged so that the viral particles loaded air is drawn outside the enclosure through said filtration means and the viral particles are retained by said filtration means.

6. A chamber according to claim 2, wherein said ventilator is mounted in a duct, said duct comprising a control door, means for remotely actuating the door at a predetermined opening of said door.

7. A chamber for use in immunizing chickens or the like fowls by treating same with a vaccine which is sprayed in said chamber, comprising:

an enclosure;

stacks of chicken containers having means enabling air to circulate therethrough;

a blower-motor combination mounted between two opposite walls of said enclosure, to direct a flow of air towards a third wall of said enclosure;

means connected to a supply of vaccine for spraying said vaccine in said flow of air;

a deflector cone mounted on said third wall with the base of said deflector spaced from said third wall, to prevent vaccine particles from adhering to the surface of the third wall, to deflect said flow of air located with particles of vaccine and to cause said air to circulate uniformly through said chicken containers, said vaccine thereby being inhaled by said chickens, resulting in vaccination of said chickens through their respiratory tracts;

a ventilator mounted over said enclosure to draw viral particles loaded air towards sealing of said enclosure;

said ventilator being associated with an electronic filter which is effective to retain up to about 97.5% of the viral particles, which are present in the flow of air, said electronic filter being followed by an absolute filter having an efficiency of 99.99% DOP which means that it is capable of removing all the particles remaining in the flow of air which exits from the electronic filter and delivers air which contains no foreign particles, the air containing viral particles being drawn through said electronic filter and said absolute filter by means of said ventilator, said ventilator following said absolute filter;

means to control the pressure inside said enclosure at a predetermined level which is lower than atmospheric pressure, and which is sufficient to prevent viral particles containing air from leaking to the outside; and means for flushing said enclosure when vaccination is terminated and previously to opening said enclosure to remove said chickens therefrom, while preventing viral particles from being thrown into the outside air.

8. A chamber according to claim 7, wherein said enclosure includes lateral walls, front wall, rear wall, bottom and ceiling, and said blower-motor combination is mounted at equal distance from said lateral walls.

9. A chamber according to claim 8, wherein said flow of air is directed towards said rear wall and said deflector is mounted on said rear wall.

* * * * *